United States Patent
Feli et al.

(10) Patent No.: US 6,925,059 B2
(45) Date of Patent: Aug. 2, 2005

(54) METHOD AND APPARATUS FOR DISTRIBUTING TRAFFIC LOAD IN A WIRELESS PACKET DATA NETWORK

(75) Inventors: Evin Feli, San Diego, CA (US); Leonard Lee, Cary, NC (US); Dayong Chen, Cary, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 864 days.

(21) Appl. No.: 09/852,332

(22) Filed: May 9, 2001

(65) Prior Publication Data

US 2002/0167933 A1 Nov. 14, 2002

(51) Int. Cl.$^7$ ............................................. H04L 12/26
(52) U.S. Cl. ....................... 370/235; 370/477; 455/453
(58) Field of Search ................................. 370/235, 477, 370/229, 230, 230.1, 328, 329, 437, 443, 450; 455/453, 434, 435, 450

(56) References Cited

U.S. PATENT DOCUMENTS 6,014,567 A * 1/2000 Budka ......................... 455/453

OTHER PUBLICATIONS

Sinha, P. et al "A Wireless Transmission Control Protocol for CDPD" Wireless Communications and Networking Conference, 1999 IEEE, Sep. 21–24, 1999, pp. 953–957, vol. 2.*

* cited by examiner

Primary Examiner—Chi Pham
Assistant Examiner—Anh-Vu H Ly
(74) Attorney, Agent, or Firm—Moore & Van Allen PLLC; Steven B. Phillips

(57) ABSTRACT

Method and apparatus for distributing traffic in a wireless packet data network. A capacity flag which is sent on each RF data channel within a cell in a wireless packet data network is toggled between an asserted and an unasserted state according to the period of a timer. Transceiver terminals will only register for a channel while that channel's capacity flag is unasserted; therefore, transceiver terminals register with the various RF channels in a cell in a distributed fashion over time. The invention can be implemented by a computer program product or logic, or a combination of the two installed at the base station for a cell within a wireless data network such as a CDPD network.

8 Claims, 5 Drawing Sheets

|  | T | 2T | 3T | 4T | 5T | Etc. |
|---|---|---|---|---|---|---|
| Capacity flag channel 1 | On | Off | On | Off | On | Etc. |
| Capacity flag channel 2 | Off | On | Off | On | Off | Etc. |
| Capacity flag channel 3 | On | Off | On | Off | On | Etc. |
| Capacity flag channel 4 | Off | On | Off | On | Off | Etc. |
| Capacity flag channel 5 | On | Off | On | Off | On | Etc. |
| Etc. | Etc. | Etc. | Etc. | Etc. | Etc. | Etc. |

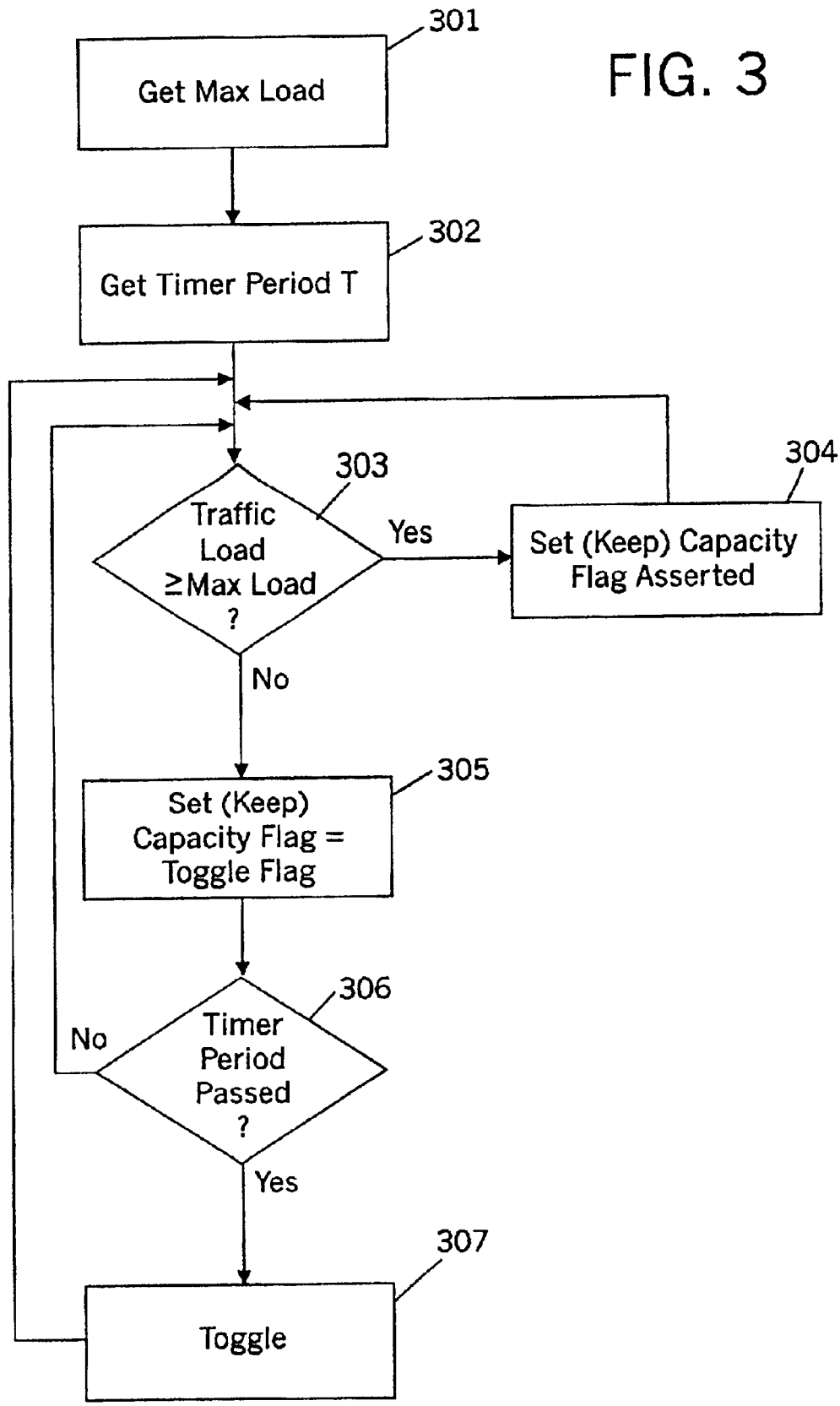

METHOD AND APPARATUS FOR DISTRIBUTING TRAFFIC LOAD IN A WIRELESS PACKET DATA NETWORK

BACKGROUND OF THE INVENTION

In modern cellular telephone systems, the transmission and reception of data has become almost as important as the transmission and reception of voice. Voice communications, in many newer networks, is carried by time division multiplexed access (TDMA), however, it is inefficient to use TDMA voice channels for data, since data does not place the same demands on the system for quality of service in terms of latency. Cellular digital packet data (CDPD) was developed to handle traffic originating in internet protocol (IP) format on cellular voice networks. CDPD is specified in the CDPD System Specification Release 1.1, 1998, published by The Wireless Data Forum.

When CDPD is used with TDMA, each cell in the cellular network has channels that can be used for CDPD data. In some systems, a channel is specifically dedicated to CDPD use. In other systems, one or more unused voice channels are used for CDPD when needed. Packet streams from multiple users are combined over the same channel, providing far more efficiency than would be possible if data was transmitted over voice channels. CDPD also conforms to the 7-layer, industry standard, open systems interconnect (OSI) model making it compatible with all major public and private packet switching networks. Despite these capabilities, however, the popularity of the Internet and the World Wide Web has put increasing pressure on CDPD resources distributed throughout the network.

The easiest way to increase the capacity of the CDPD network is to add channels to the cells. In high-traffic areas, a cell might have two, three, four, or even more CDPD channels for traffic from multiple users, either dedicated CDPD channels, or unused voice channels. However, full capacity of these channels is seldom realized. When a new transceiver is added to the CDPD load of the cell, it tries to register with the radio frequency (RF) channel with the highest signal strength. Typically, due to terrain and limitations on how transmitting towers are distributed within a cell, certain channels will be stronger in parts of the cell than other channels. In some cases, the network capacity does not increase significantly by just adding channels. Some channels bear most of the traffic while others remain underused.

BRIEF SUMMARY OF THE INVENTION

The present invention improves load distribution by setting and clearing a capacity flag which is sent on each RF channel within a cell in a wireless packet data network. The invention effectively forces transceiver terminals to register with the various RF channels in a cell in a distributed fashion. In one embodiment, the invention works within the CDPD standard. Because it works within the standard, it is transparent to terminals which operate according to the CDPD standard. Existing terminals can take advantage of the invention without modification.

According to one embodiment of the invention, traffic is distributed among channels by continuously toggling a capacity flag for each channel between an asserted and unasserted state while the channel is available. In CDPD, the capacity flag is normally used to indicate that a channel is unavailable because it has reached its maximum capacity. If the capacity flag is not asserted, the channel is considered available. In this embodiment, the capacity flag is still continuously asserted while the channel is unavailable due to high-traffic load, or other reasons. However, even when the channel is available, that is, it can handle additional traffic, the capacity flag is toggled on and off. A handset will not register with a channel when the capacity flag is asserted. Therefore, between channels which each have extra capacity to handle additional traffic, handsets register with both channels because at some times, only one's capacity flag is not asserted, while at other times, only the other's capacity flag is not asserted. At any particular time among available channels, capacity flags are in the asserted state for at least a first group of the channels while capacity flags are in the unasserted state for at least a second group of the channels so that traffic is distributed among the channels. Channels can be grouped into more than two groups. If the channels are grouped in two groups only, a timer is used to toggle the capacity flags on and off for each of the available channels. In this case, the flag is asserted for a first group of the channels and unasserted for a second group of the channels during any specific timer period.

The invention can be implemented in a number of ways. In one embodiment, a mobile data base station which implements the invention for a particular cell is programmed with a computer program product which performs the steps of the invention. This computer program contains instructions which operate a radio resource management entity (RRME) which generates capacity flags for the various channels. The computer program product operates a control block within the base station, which controls at least one, and usually multiple, modem transceivers. The computer program product establishes a toggle flag for each channel that changes state according to a timer so that at any particular time toggle flags are in the asserted state for a group of the channels and in the unasserted state for at least another group of the channels. Additionally, a maximum load flag is asserted if an actual traffic load is greater than or equal to a maximum load specified by a provider. The capacity flag can be a logical ORing of the toggle flag and the maximum load flag. The software, programmable control block, modem transceivers, and other hardware in a base station combine to form the means to carry out the invention. It is also possible to implement the invention in logic. In this case, a toggle flag generator would generate the toggle flag based on a timer, a maximum load flag generator would assert the maximum load flag, based on a value stored in memory, and an OR gate would actually OR the two flags together. The output of the OR gate would be the capacity flag for a given channel.

BRIEF DESCRIPTION OF THE DRAWINGS

FIG. 3 is a flow chart illustrating the method of the invention.

DETAILED DESCRIPTION OF THE INVENTION

In one embodiment of the invention, distribution of registrations across channels is caused by setting and clearing the capacity flag message for each channel within a cell. The flag changes states with period T. The period, in most cases, is defined as a system parameter that can be selected by the system operator. The time period T is controlled by a timer. This timer may be a separate timing device dedicated to this purpose, or it may simply be one of the internal clocks within the control block of the mobile data base station (MDBS). Registrations by different mobile terminals or handsets are spread in time among channels because the terminal will not register on a channel for which the capacity flag is asserted. No mobile terminals will be allowed to register on a channel that is too congested. If the traffic load exceeds a certain threshold, the capacity flag will be asserted continuously. We call this threshold the "maximum load" threshold or "max-load" and it is also defined as a system parameter that can be configured by the system operator. The traffic load is determined by counting the number of frames for both down link and up link over time on a given channel. It should be noted that, although a continuously asserted capacity flag is usually used to prevent terminals from registering on a particular channel due to high traffic load, it will prevent registration for any other reason that causes it to be asserted. Many systems are designed to assert the capacity message flag for a variety of reasons, including when a transmitter is down, or when there is a problem in the network beyond the local MDBS. The capacity flag is sent in the channel stream identification message specified in the CDPD standard. This message is sent by the radio resource management entity (RRME) which is within the data link layer of the CDPD, OSI protocol stack.

Figure 1:
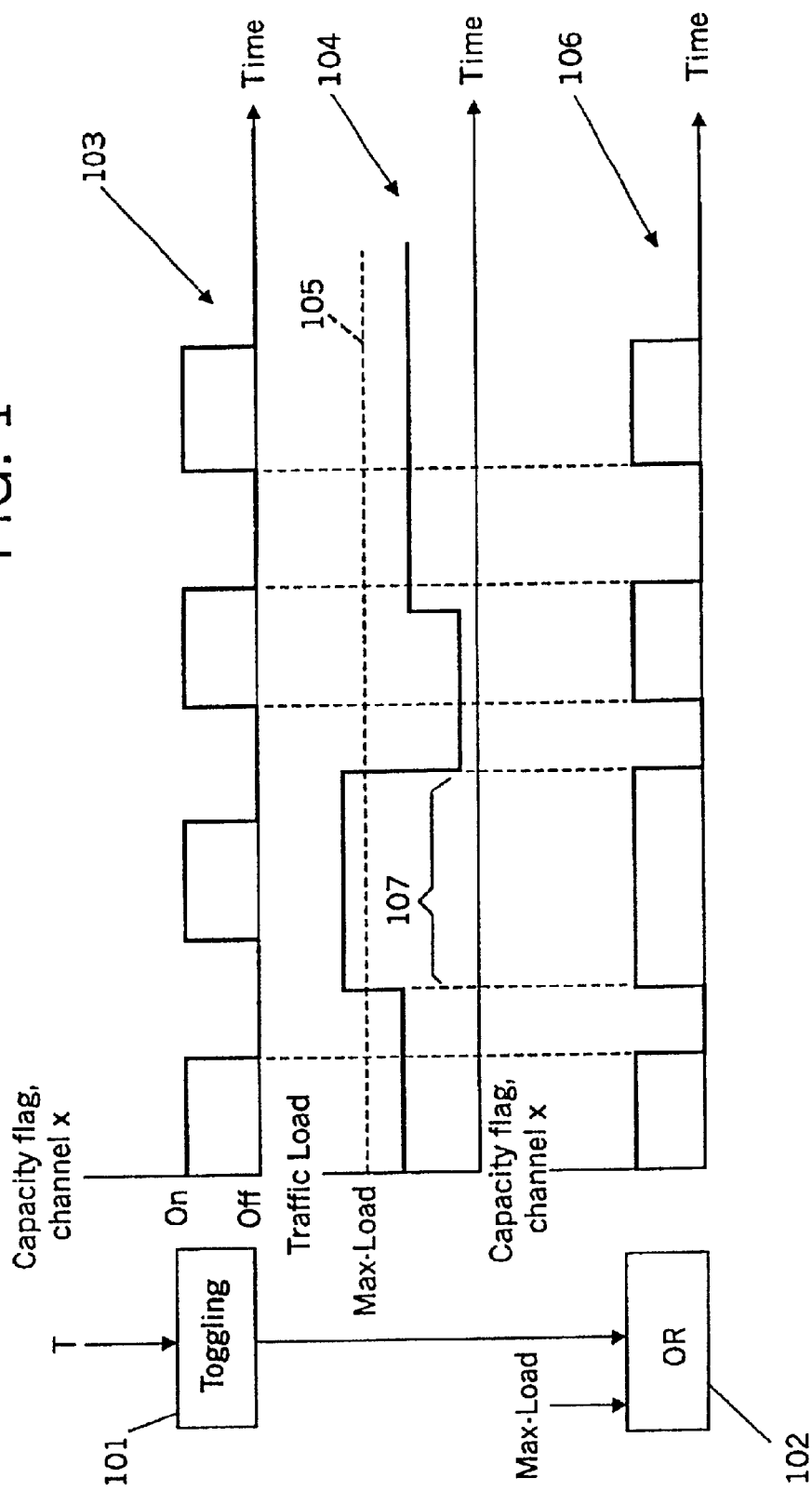
FIG. 1 is a timing diagram which illustrates how the invention operates for a single channel within a network.

FIG. 1 is a timing diagram illustrating the operation of the invention on a particular channel according to one embodiment. In FIG. 1, the output of timer T is fed into a toggling block, 101, which generates an on/off signal we call a toggle flag as shown at 103. A toggling block or toggling blocks, may generate multiple signals, one for each channel or group of channels. A toggle flag signal for a different channel in a different group of channels would be offset from this signal, for example, by 180°. At 104, a waveform is shown as a solid line which represents the actual traffic load on the particular channel being illustrated (in the drawing, referred to as channel x). Dotted line 105 represents the maximum traffic load (max-load) that has been specified by the service provider. Wherever on the timeline the actual traffic load rises above max-load 105 a max-load flag is asserted. In this example, the max-load flag is asserted as shown at 107. The max-load flag and the output of the toggle block, the toggle flag, are applied to an OR function, 102. This OR function can be implemented in software, by a special purpose semiconductor device, or by an OR gate. In any case, the capacity flag for channel x is generated according to a waveform like that shown at 106. As long as the maximum load for the channel has not been met or exceeded, the capacity flag toggles on and off according to the period T of the timer.

Figures 2, 4:
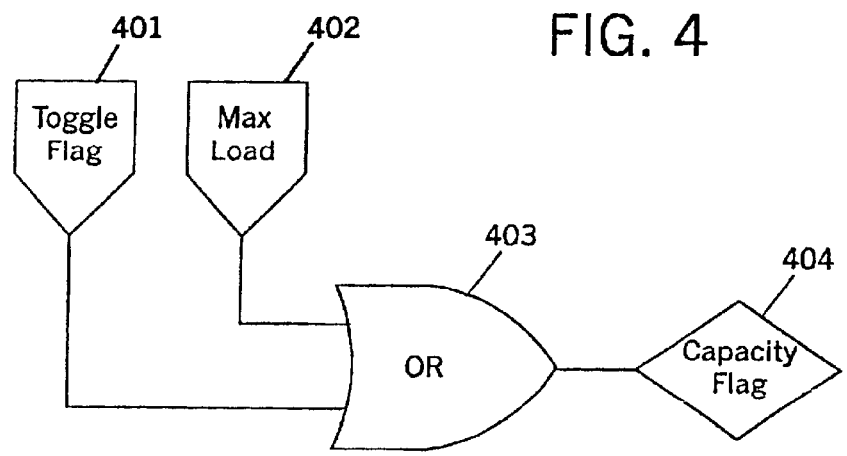
FIG. 2 is a table which illustrates how the capacity flag is set according to the invention where the channels are divided into two groups.
FIG. 4 illustrates how the invention can be logically implemented as an ORing of a toggle flag and a max-load flag to produce the capacity flag.

FIG. 2 is a table, which illustrates how the invention works with two groups of channels, a first group and a second group of channels. The invention is only fully operational with available channels, that is, channels where the maximum load has not been reached or exceeded. In the table of FIG. 2, channels 1, 3, and 5 are in one group and channels 2 and 4 are in another group. The toggle flags for these two groups of channels are 180° apart. In one timer period, one group of channels has the capacity flag asserted while the other has it unasserted, and in the next timer period, the first group of channels has the capacity flag unasserted while the second group has the flag asserted. As user terminals register for RF channels, some register on one of the first group of channels, and others register on one of the second group of channels according to the state of the capacity flags which has been imposed by the invention. Among channels with capacity flags unasserted, handset terminals will register with the strongest signal.

It should be noted that the embodiment in which the channels are divided into two groups is shown by way of example only. It is possible to achieve load distribution by dividing the channels into three or more groups if there are enough channels in the cell. For example, if three groups are used, as the capacity flags for each group of available channels toggle, the groups of channels can be staggered with a third of the channel's flags changing state at a time. It is also possible to randomize the capacity flag settings on available channels by using multiple timers of different, possibly varying periods, or through the use of more complex software or logic.

FIG. 3 is a flow chart, which illustrates one embodiment of the method of the present invention. As previously stated, a maximum load as well as the timer period T is specified by a service provider and will thus be stored in memory within the base station which is implementing the invention. At step 301, the max-load value is retrieved. At step 302, the appropriate timer period T is retrieved. At step 303, a check is made to determine if the traffic load on the particular channel which is being managed is greater than or equal to max-load. If the answer is yes, the capacity flag for that channel is kept asserted at step 304. If the traffic load on the channel does not exceed or equal max-load, the capacity flag is set to the same state as the toggle flag, or the output of the toggle block, toggling logic, or software. At 306 the timer is monitored to determine when the next timer period has passed. As long as the timer period has not passed, the process continues to check the traffic load at step 303. Once the timer period has passed the toggle flag changes states at step 307. The process repeats, and assuming that the traffic load does not equal or exceed max-load at step 303, the capacity flag is reset to match the new state of the toggle flag at step 305. Note that this process occurs for each channel independently, except for the fact that in one embodiment, the processes are all keyed to the same timer. In this case, some channel's capacity flags will be changing to the asserted states while other are becoming unasserted at step 307.

FIG. 4 provides a conceptual illustration of how the capacity flag is generated by ORing together a flag representing when max-load has been reached or exceeded and a toggle flag which is tied to the timer. Toggle flag 401 and max-load flag 402 form inputs to OR gate 403. Capacity flag 404 is generated as an output of the gate. This process takes place individually for all of the channels in a given cell. While it is possible to design an array of logic gates to perform the functions required to carry out the invention, in most systems the invention is implemented in a computer program product which controls the operation of an MDBS. In this case, a software function would perform the functions of OR gate 403.

Figure 5:
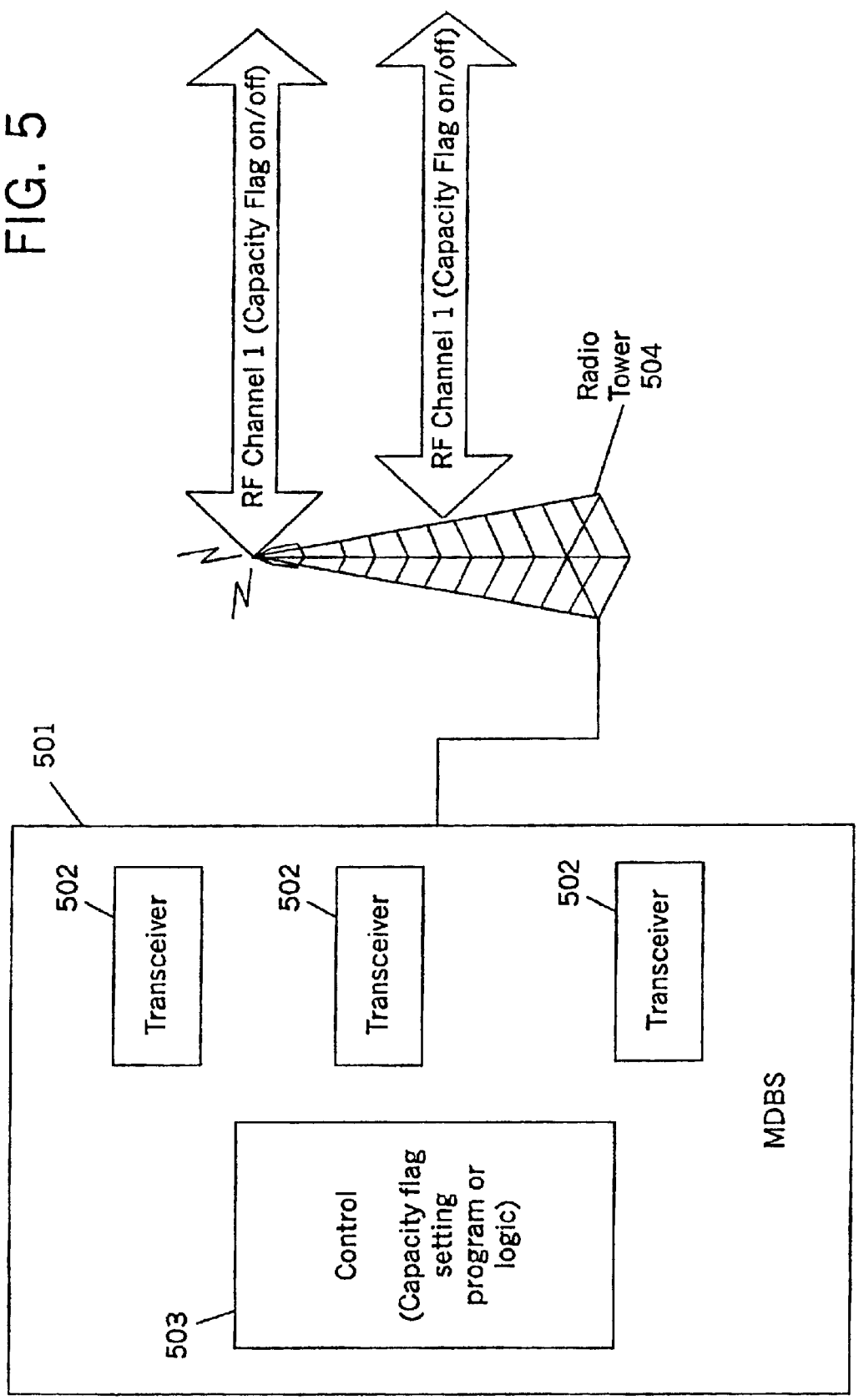
FIG. 5 is a functional block diagram of a mobile data base station system which is implementing the invention.

FIG. 5 is a block diagram illustrating the operating environment of the present invention. Mobile data base station (MDBS) 501 contains at least one, and usually a plurality, of modem transceivers 502. These modem transceivers operate under the control of control block 503. Control block 503 is a programmable, microprocessor system including a computer program product or products as well as other logic circuits, either of which, or a combination of the two, may be carrying out the invention. Control block 503 controls all of the functions of the MDBS and enables it to send and receive data over RF channels in the cell or group of cells for which it is responsible. MDBS 501 is connected to radio tower 504, which includes the appropriate antennas to send and receive data on the RF channels for a particular cell. Each RF channel has a capacity flag, which is toggled, on and off according to the CDPD embodiment of the invention. The capacity flag is in the channel stream identification message sent by the radio resource management entity.

Figure 6:
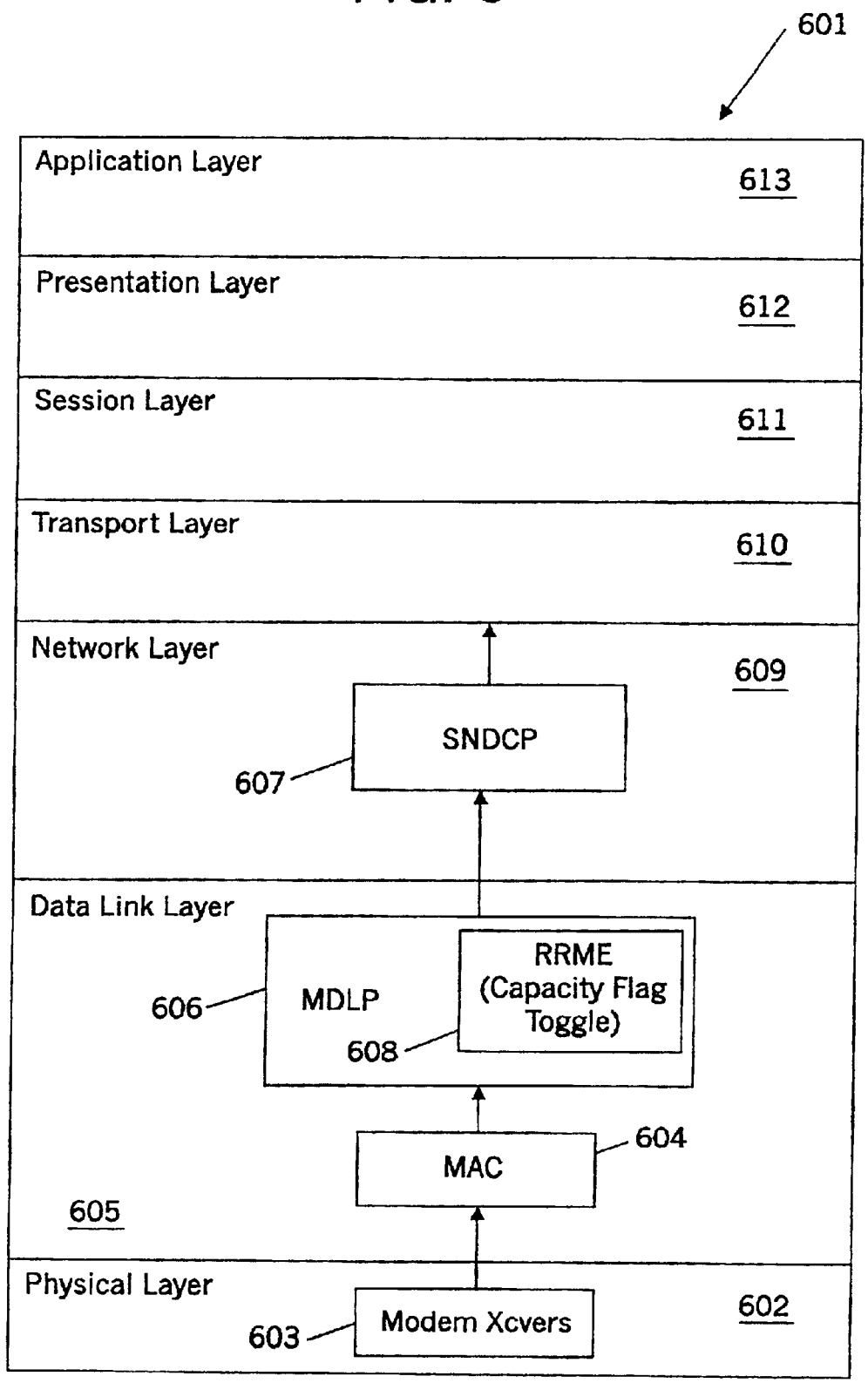
FIG. 6 illustrates how the invention works within the CDPD protocol stack.

FIG. 6 illustrates the basic layered structure of the CDPD protocol and how the functionality of the invention fits into the protocol. The basic structuring of the protocol follows the 7-layer OSI model. Each layer may be further partitioned into a similar sequence of sublayers. The CDPD specifications define a number of sublayers as building blocks that may be combined to define a CDPD network.

Protocol stack 601 includes a physical layer, data link layer, network layer, transport layer, session layer, presentation layer, and an application layer. Physical layer 602 is where the modem transceivers, 603, reside. A media access control sublayer, 604, resides in the data link layer, 605. Data link layer 605 also includes the mobile data link protocol (MDLP), 606, which operates within the data link layer to provide link control services between end systems and intermediate systems. MDLP uses the services of the MAC layer below to provide access to the physical channel and transparent transfer of link layer frames between data link layer entities. The MDLP includes the RRME, 608, which is the sublayer that sets the capacity flag that is used in one embodiment of the present invention. In FIG. 6, the invention has been employed in the RRME, 608, and the RRME toggles the capacity flag to distribute traffic across channels in accordance with the invention. Subnetwork dependant convergence protocol (SNDCP), 607, provides a number of services from within network layer 609. These include the transparent transfer of user data and confidentiality functions. Transport layer 610, session layer 611, presentation layer 612, and application layer 613 provide higher level services in the same manner as other OSI based protocols. In particular, CDPD, as well as the invention, are completely compatible with IP based network traffic.

We have described specific embodiments of an invention, which provides method and apparatus for distributing traffic load in a packet data network. One of ordinary skill in the networking and computing arts will quickly recognize that the invention has other applications in other environments. In fact, many embodiments and implementations are possible. In addition, the recitation "means for" is intended to evoke a means-plus-function reading of an element in a claim, whereas, any elements that do not specifically use the recitation "means for," are not intended to be read as means-plus-function elements, even if they otherwise include the word "means." The following claims are in no way intended to limit the scope of the invention to the specific embodiments described.

We claim:

1. A method of setting capacity flags to enable the distribution of traffic among channels in a packet data system having at least two channels, the method for each channel comprising:

establishing a toggle flag for each channel that changes state according to a timer so that at any particular time, toggle flags are in the asserted state for all of a first group of the at least two channels, while toggle flags are in the unasserted state for all of at least a second group of the least two channels;

asserting a maximum load flag if an actual traffic load is greater than or equal to a maximum load; and setting a capacity flag by ORing the toggle flag and the maximum load flag, so that traffic is distributed among channels for which the actual traffic load is less than the maximum load.

2. The method of claim 1 wherein the toggle flag changes state upon every period of the timer.

3. Apparatus for setting capacity flags in a packet data system for enabling the distribution traffic among at least two channels, the apparatus comprising:

a toggle flag generator for generating a toggle flag for each channel that change state according to a timer so that at any particular time, toggle flags are in the asserted state for all of a first group of the at least two channels, while toggle flags are in the unasserted state for all of at least a second group of the least two channels;

a maximum load flag generator that asserts a maximum load flag if an actual traffic load is greater than or equal to a maximum load; and an OR function for each channel including two inputs and a capacity flag output, wherein one of the two inputs of the OR function is connected to the toggle flag generator and another of the two inputs of the OR function is connected to the maximum load flag generator, so that the output is the logical OR of the toggle flag and the maximum load flag.

4. The apparatus of claim 3 wherein the toggle flag changes state upon every period of the timer.

5. A mobile data base station comprising:

at least one modem transceiver; and a programmable control block connected to the modem transceiver, the control block being enabled by a computer program to distribute traffic among channels by:

establishing a toggle flag for each channel that changes state according to a timer so that at any particular time, toggle flags arc in the asserted state for all of a first group of the at least two channels, while toggle flags are in the unasserted state for all of at least a second group of the least two channels;

asserting a maximum load flag if an actual traffic load is greater than or equal to a maximum load; and establishing a capacity flag by ORing the toggle flag and the maximum load flag, so that traffic is distributed among channels for which the actual traffic load is less than the maximum load.

6. The mobile data base station of claim 5 wherein the toggle flag changes state upon every period of the timer.

7. Apparatus for distributing traffic among channels in a packet data system including at least two channels, the apparatus comprising:

at least one modern transceiver;

a toggle flag generator for generating a toggle flag for each channel that change state according to a timer so that at any particular time, toggle flags are in the asserted state for all of a first group of the at least two channels, while toggle flags are in the unasserted state for all of at least a second group of the least two channels;

a maximum load flag generator that asserts a maximum load flag if an actual traffic load is greater than or equal to a maximum load; and an OR function for each channel including two inputs and a capacity flag output operatively coupled to the modern transceiver, wherein one of the two inputs of the OR function is connected to the toggle flag generator and another of the two inputs of the OR function is connected to the maximum load flag generator, so that the capacity flag output is the logical OR of the toggle flag and the maximum load flag.

8. The apparatus of claim 7 wherein the toggle flag changes state upon every period of the timer.

\* \* \* \* \*